(12) United States Patent
Baset et al.

(10) Patent No.: US 8,839,243 B2
(45) Date of Patent: Sep. 16, 2014

(54) REMEDIATING RESOURCE OVERLOAD (75) Inventors: Salman A. Baset, New York, NY (US);
Rafah A. Hosn, New York, NY (US);
Ruchi Mahindru, Elmsford, NY (US);
Harigovind V. Ramasamy, Ossining, NY (US); Soumitra Sarkar, Cary, NC (US); Chunqiang Tang, Ossining, NY (US); Norbert G. Vogl, Mahopac, NY (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 13/453,019

(22) Filed: Apr. 23, 2012

(65) Prior Publication Data
US 2013/0283266 A1  Oct. 24, 2013

(51) Int. Cl.
*G06F 9/455*  (2006.01)

(52) U.S. Cl.
USPC ............................................................ 718/1

(58) Field of Classification Search
CPC ................................................. G06F 9/45533
USPC ............................................................ 718/1
See application file for complete search history.

(56) References Cited

U.S. PATENT DOCUMENTS

| 7,904,540 | B2 | 3/2011 | Hadad et al. | |
| 8,078,824 | B2 | 12/2011 | Sugumar et al. | |
| 2007/0260702 | A1* | 11/2007 | Richardson et al. | 709/217 |
| 2009/0300605 | A1 | 12/2009 | Edwards et al. | |
| 2010/0169253 | A1* | 7/2010 | Tan | 706/21 |
| 2010/0180275 | A1* | 7/2010 | Neogi et al. | 718/1 |
| 2011/0239010 | A1 | 9/2011 | Jain et al. | |
| 2012/0011240 | A1* | 1/2012 | Hara et al. | 709/223 |

FOREIGN PATENT DOCUMENTS

EP  2309387  4/2011

OTHER PUBLICATIONS

Dan Williams, Hakim Weatherspoon, Hani Jamjoom Yew-Huey Liu, Overdriver: Handling Memory Overload in an Oversubscribed Cloud, VEE'11, Mar. 9-11, 2011, Newport Beach, California, USA., IEEE.*
Jing Xu, José A. B. Fortes, A Multi-objective Approach to Virtual Machine Management in Datacenters, !ICAC'11, Jun. 14-18, 2011, Karlsruhe, Germany, ACM.*
Alexander Pokluda, Gaston Keller and Hanan Lutfiyya, Managing Dynamic Memory Allocations in a Cloud through Golondrina, 2010 IEEE.*
Wood et al., Black-Box and Gray-Box Strategies for Virtual Machine Migration, 4th USENIX Symposium on Networked Systems Design & Implementation, Mar. 16, 2007, pp. 1-16.

(Continued)

*Primary Examiner* — Emerson Puente
*Assistant Examiner* — Charlie Sun
(74) *Attorney, Agent, or Firm* — Ryan, Mason & Lewis, LLP (57) ABSTRACT

A method, an apparatus and an article of manufacture for remediating overload in an over-committed computing environment. The method includes measuring resource usage of each of multiple virtual machines on each of at least one hypervisor in a computing environment, upon detection of a resource overload on one of the at least one hypervisor, determining at least one operation that is to be taken for at least one of the multiple virtual machines on the hypervisor to remediate resource overload while increasing values of running virtual machines, and sending a command to the hypervisor to issue the at least one operation.

23 Claims, 5 Drawing Sheets

(56) References Cited

OTHER PUBLICATIONS

Bobroff et al., Dynamic Placement of Virtual Machines for Managing SLA Violations, IM'07, 10th IFIP/IEEE International Symposium on Integrated Network Management, 2007, pp. 119-128.

Steinder et al., Server Virtualization in Autonomic Management of Heterogeneous Workloads, 10th IFIP/IEEE International Symposium on Integrated Network Management 2007, pp. 1-25.

Xu et al., Virtual Machine Migration Strategy in Federated Cloud, IC2011, internetconference.org, pp. 25-31.

Nocentino et al., Toward Dependency-Aware Live Virtual Machine Migration, VTCD'09, Proceedings of the 3rd International Workshop on Virtualization Technologies in Distributed Computing, Jun. 2009, pp. 59-66.

Liu et al., Performance and Energy Modeling for Live Migration of Virtual Machines, HPDC'11, Jun. 8-11, 2011, San Jose, California, USA, pp. 171-181.

Hermenier et al., Entropy: A Consolidation Manager for Clusters, Proc. of ACM SIGPLAN/SIGOPS Int'l Conf. on Virtual Execution Environments, 2009, pp. 1-10.

Jung et al., Mistral: Dynamically Managing Power, Performance, and Adaptation Cost in Cloud Infrastructure, Proc. of IEEE International Conference on Distributed Computing Systems, 2010, pp. 62-73.

Karve et al., Dynamic Placement for Clustered Web Applications, Proc. of International Conference on World Wide Web, 2006, pp. 1-10.

Carrera et al., Utility-Based Placement of Dynamic Web Applications with Fairness Goals, Proc. of IEEE Network Operations and Management Symp. 2008, pp. 1-8.

Roy et al., Efficient Autoscaling in the Cloud Using Predictive Models for Workload Forecasting, Proc. of IEEE International Conference on Cloud Computing, 2011, pp. 1-8.

Andreolini et al., Dynamic Load Management of Virtual Machines in a Cloud Architectures, Proc. of IEEE International Conference on Cloud Computing, 2009, pp. 1-14.

Khanna et al., Application Performance Management in Virtualized Server Environments, Proc. of IEEE/IFIP Network Operations and Management Symp. 2006, pp. 373-381.

Williams et al., Overdriver: Handling Memory Overload in an Oversubscribed Cloud, Proc. of ACM SIGPLAN/SIGOPS International Conference on Virtual Execution Environments, 2011, pp. 1-12.

Kounev et al., Towards Self-Aware Performance and Resource Management in Modern Service-Oriented System, Proc. of IEEE International Conference on Services Computing, 2010, pp. 1-4.

Heo et al., Memory Overbooking and Dynamic Control of Xen Virtual Machines in Consolidated Environments, Proc. of IFIP/IEEE International Symp. on Integrated Network Management, 2009, pp. 630-637.

Pokluda et al., Managing Dynamic Memory Allocations in a Cloud Through Golondrina, International DMTF Academic Alliance Workshop on Systems and Virtualization Management, 2010, pp. 7-14.

Van et al., SLA-aware Virtual Resource Management for Cloud Infrastructure, Proc. of IEEE International Conference on Computer and Information Technology, 2009, pp. 357-362.

Huber et al., Model-Based Self-Adaptive Resource Allocation in Virtualized Environments, Proc. of International Symp. on Software Engineering for Adaptive and Self-Managing Systems, 2011, pp. 1-10.

Memory Overcomittment Manager, //github.com/aglitke/mom downloaded Jul. 10, 2012, pp. 1-6.

IBM Infrastructure as Service (IaaS): Overview, w-935.ibm.com/services/us/en/cloud-enterprise/downloaded, Jul. 10, 2012, pp. 1-2.

Open Source Software for Building Private and Public Clouds, openstack.org downloaded Jul. 10, 2012, pp. 1-3.

Xu et al. A Multi-Objective Approach to Virtual Machine Management in Datacenters, Proc. of ACM International Conference on Autonomic Computing, 2011.

Isci et al. Runtime Demand Estimation for Effective Dynamic Resource Management, Proactive Problem Prediction, Avoidance and Diagnosis Conference, 2009.

Iwama et al. Removable Online Knapsack Problems, Automata, Languages and Programming, LNCS, 2002, vol. 2380.

Wikipedia. Time Series http://en.wikipedia.org/w/index.php?title=Time_series&oldid=486984156. Apr. 12, 2012.

* cited by examiner

REMEDIATING RESOURCE OVERLOAD

FIELD OF THE INVENTION

Embodiments of the invention generally relate to information technology, and, more particularly, to virtual machine management.

BACKGROUND

Resource oversubscription in computing cloud systems is becoming common in information technology (IT) services. Virtual machines (VMs) are often provisioned to host separate services in the cloud systems. Traditionally, these VMs are provisioned with all of their allocated resources (for example, memory and central processing unit (CPU)) guaranteed in the physical resources. Resource allocation of more than the amount that can be guaranteed by the physical resources, that is, resource oversubscription, allows for more VMs to be hosted on a hypervisor. As VMs often do not consume all of the allocated resources, over-subscription can increase resource utilization, and as a result, reduce cost of service provision.

However, oversubscription brings the risk of resource overload in the hypervisor before hosted VMs use up the allocated resources, and the resource overload, especially memory overload, largely degrades service performance.

Existing approaches attempting to remedy the undesirable consequences of oversubscription include migration-only solutions. However, migration-only solutions are not sufficient to remediate overload in over-committed systems (in these systems, there exists the possibility for a large number of hypervisors to be close-to-overload at the same time), and migration overhead may be large in a dense over-committed hypervisor cluster.

Accordingly, a need exists for remediating an overload in over-committed computing environments.

SUMMARY

In one aspect of the present invention, techniques for remediating resource overload are provided. An exemplary computer-implemented method for remediating overload in an over-committed computing environment can include steps of measuring resource usage of each of multiple virtual machines on each of at least one hypervisor in a computing environment, upon detection of a resource overload on one of the at least one hypervisor, determining at least one operation that is to be taken for at least one of the multiple virtual machines on the hypervisor to remediate resource overload while increasing values of running virtual machines, and sending a command to the hypervisor to issue the at least one operation.

In another aspect of the invention, techniques for an automated overload remediation method for a virtualized environment are provided. An exemplary computer-implemented method includes the steps of recovering from a system resource overloaded situation by selecting, from a plurality of virtual machines in the system, a subset of the virtual machines to migrate and a subset of the virtual machines to quiesce, and periodically selecting a subset of the virtual machines to migrate and a subset of the virtual machines to resume to increase the number of running virtual machines and increase work value achieved by the running virtual machines.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes remediating overload in over-committed computing environments. At least one embodiment of the invention includes providing a mechanism to remediate overload without assuming that there is always resource available for migration. As detailed herein, a work value notion is used to compare the importance of VMs, and the overload remediation problem is formulated as a variant of the Removable Online Multi-Knapsack Problem (ROMKP). An aspect of the invention includes an algorithm to solve this optimization problem.

An embodiment of the invention can be implemented, for example, in a large commercial cloud environment. When no resource-available hypervisors exist, at least one embodiment of the invention includes discarding certain computations temporarily, that is, quiescing one or more VMs determined to be less important, to remediate the ongoing overload so that the rest of the VMs run normally. After a set of VMs complete their jobs and terminate normally or release resources, resources become available and quiesced VMs are resumed to finish their jobs. Accordingly, as detailed herein, an aspect of the invention includes determining which operations (migration, quiesce or resume) should be taken for which VMs, in order to remediate resource overload in over-subscribed computing systems which may not have sufficient resources, while increasing (for example, maximizing) the values of running services.

Further, at least one embodiment of the invention includes combining considerations of quiesce, resume and migration operations of VMs to provide an algorithm that addresses this problem variant. Accordingly, the algorithm incorporates considerations of the cost of the quiesce/migration/resume operations, and a global optimization is approximated by a heuristic algorithm.

Figure 1:
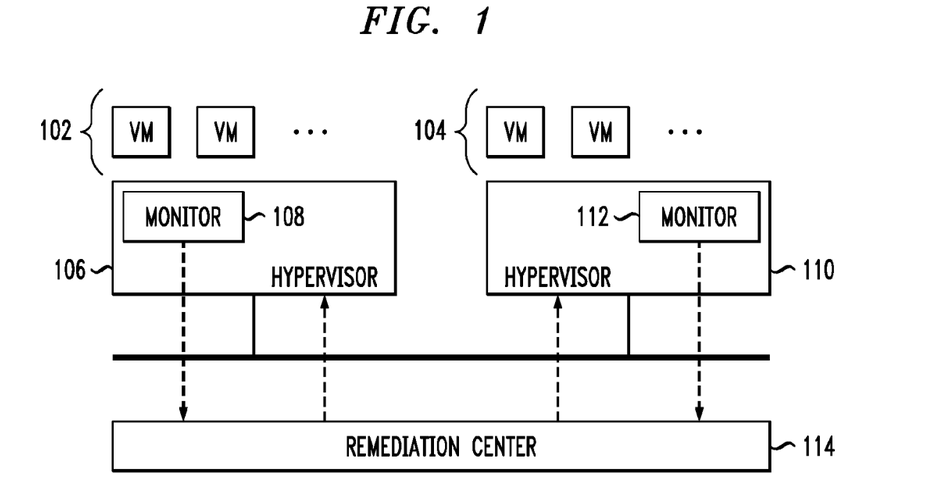
FIG. 1 is a diagram illustrating example architecture of the overload-remediation system in a cloud, according to an embodiment of the present invention.

FIG. 1 is a diagram illustrating example architecture of the overload-remediation system in a cloud, according to an embodiment of the present invention. By way of illustration, FIG. 1 depicts hypervisors 106 and 110 that are interconnected. Images of VMs (for example, VMs 102 and 104) are placed on the storage shared across all hypervisors. Accordingly, a VM can be started or resumed on any hypervisor. A monitor (such as depicted by components 108 and 112) installed in each hypervisor periodically measures the resource usage of all VMs on the hypervisor and reports the resource measurement to the remediation center component 114.

When an overload on a hypervisor is detected by the monitor in the hypervisor, the remediation center has the knowledge on resource usages of all of the hypervisors in the cloud, and makes decisions of which VMs are to be migrated or quiesced or resumed. Additionally, the remediation center sends commands to corresponding hypervisors to issue operations. The message transmissions between the monitors and the remediation center are illustrated via the dashed lines in FIG. 1.

As resource usage of a VM changes with time, and VM provision and de-provision occur from time to time, resource usage in the cloud changes as well. Accordingly, the remediation center periodically checks whether sufficient resources become available for any quiesced VMs to resume.

As detailed herein, an aspect of the invention includes the use of a notion of "work value" to define the importance of a VM. Work value, as used herein, aims at measuring the potential loss of the services/tasks on a VM caused by the VM's being quiesced, and/or the impacts of a VM's being quiesced on the execution of other VMs. These values are not measured as utility in traditional VM placement techniques because such approaches do not quiesce VMs. For example, work value includes the expected work to be done by a quiesced VM if it was not quiesced, and the utilities in these techniques do not consider this aspect.

An objective of at least one embodiment of the invention is to quiesce VMs performing the least amount of work value, and resume VMs that were performing more work value. As described herein, an analytic model is used to assess work value of each VM, leveraging existing analysis (for example, time series with seasonality) of VM metrics to compute/estimate work value. Such a computation can incorporate knowledge of patterns of predicted workload, life-time predictions from past or workload type, customer style, etc.

Also, at least one embodiment of the invention includes using a dependency model to assess work value of each VM. This can include, for example, static dependency via configuration analysis, dynamic dependency, and/or use of other heuristics such as VM price, current central processing unit (CPU) work, etc.

One example embodiment of work value is revenue, or price. If price is not used as the work value, the work value may be indicated by service types. When a VM providing critical services such as email and network file system (NFS) is quiesced, it can cause great loss. The potential loss can be estimated directly from knowledge about a VM's services, or by leveraging analytical models if such direct knowledge is not available. For example, if a VM provides backup service for a number of machines and performs the backup service regularly once a week, the analysis of time series with seasonality can be applied to detect the regularity of this VM's service and predict the criticality of this VM at a specific time. Workload patterns can also be predicted and used to determine the importance of a VM's work at a specific time.

In addition to using knowledge about services, analytical models, and workload patterns to estimate the work value, administrators can specify a computation of the work value of VMs at any time t. An example of computing the work value is given below (the parameters $V_1$, $V_2$, $V_3$, and the function V_pattern( ) are to be properly set):

```
estimate_work_value(a_vm, t) {
    if a_vm is known that it provides critical services all the time
        work_value(a_vm, t) = V₁ for any time;
    else if a_vm is estimated to be running regularly-scheduled critical
        services
        work_value(a_vm, t)=V₂ for scheduled time;
        work_value(a_vm, t)=V₃ for other time;
    else if the workload pattern on a_vm is predicted
        work_value(a_vm, t)=V_pattern (workload_pattern, t) // with the
        workload pattern
known, we can get its work value at time t
    else
            work_value(a_vm, t)=average amount of load in a_vm in its
            past history
}
```

Besides the loss of the quiesced VM's service, the quiesced VM may also impact other VMs which depend on the quiesced VM. By way of example, a stock trading service in a WebSphere Application Server (WAS) depends on a DB2 server, and the WAS and DB2 servers exist in two separate VMs. When the DB2 VM is quiesced, the WAS VM does not achieve any work value.

Additionally, at least one embodiment of the invention can include optimizing the total work values of running VMs in dependency-free scenarios when certain VMs are selected to be quiesced, migrated, or resumed. In dependency-free scenarios, a VM's work value is independent of the work values of other VMs. In such a scenario, the problem is a variant of multiple-knapsack problem (MKP), or more specifically, a variant of Removable Online MKP, because VMs are to be provisioned, removed from hypervisors, and relocated from one hypervisor to another, and VMs have changing resource usages and work values. Besides work values, costs of VM quiescing and migration are also considered in handling this problem.

By way of example, consider a cloud computing environment that has m hypervisors: $H_1, H_2, \ldots, H_m$. $H_i$ has the amount of resource $R_i$ (for simplicity of this example, assume that there is one type of resource; however, it is to be appreciated that at least one embodiment of the invention can be extended to support multiple types of resources). Also, assume there are n VMs: $VM_1, VM_2, \ldots, VM_n$. The variables used herein are defined as follows:

$u_j$ work value to be completed by $VM_j$
$r_j$ resource being used by $VM_j$
$R_i$ resource in $H_i$
$x_{i,j}$ 1: $VM_j$ running on $H_i$; 0: otherwise
$cq_j$ cost of quiescing $VM_j$
$cr_j$ cost of resuming $VM_j$ $cm_j$ cost of migrating $VM_j$ $\mu$ threshold percentage for overload detection $u_j$, $r_j$, and $x_{i,j}$ change with time; accordingly, they are denoted as a function of time t: $u_j(t)$, $r_j(t)$, and $x_{i,j}(t)$. Formally, the following is given:

$$\begin{cases} \sum_{i=1}^{m} x_{i,j}(t) \leq 1, \text{ for } 1 \leq j \leq n \\ x_{i,j}(t) \in \{0, 1\}, \text{ for all } 1 \leq j \leq n, 1 \leq i \leq m \end{cases}$$

and the system is experiencing resource overload (when the overload is remediated) or not (when quiesced VMs are resumed). That is, $$\exists i, \sum_{j=1}^{n} r_j(t) * x_{i,j}(t) \geq R_i * \mu, 1 \leq i \leq m, \text{ or}$$

$$\sum_{j=1}^{n} r_j(t) * x_{i,j}(t) \leq R_i * \mu, \text{ for all } 1 \leq i \leq m.$$

At least one embodiment of the invention attempts to obtain $$\max\left(\sum_{i=1}^{m}\sum_{j=1}^{n}(u_j(t+1) * x_{i,j}(t+1))\right) \text{ by selecting } x_{i,j}(t+1) \text{ subject to}$$

$$\begin{cases} \sum_{j=1}^{n} r_j(t+1) * x_{i,j}(t+1) \leq R_i * \mu, 1 \leq i \leq m \\ \sum_{i=1}^{m} x_{i,j}(t+1) \leq 1, \text{ for } 1 \leq j \leq n \\ x_{i,j}(t+1) \in \{0, 1\}, \text{ for all } 1 \leq j \leq n, 1 \leq i \leq m \end{cases}$$

and $$\begin{cases} \text{quiesce cost} = \sum_{k=1}^{|YQ|}\left(cq_{yq_k} * \sum_{i=1}^{m} x_{i,yq_k}(t+1)\right) \leq thrd_q, yq \in YQ \\ \text{resume cost} = \sum_{k=1}^{|YR|}\left(cr_{yr_k} * \sum_{i=1}^{m} x_{i,yr_k}(t+1)\right) \leq thrd_r, yr \in YR \\ \text{migration cost} = \sum_{k=1}^{|YM|}\left(cm_{ym_k} * \sum_{i=1}^{m} x_{i,ym_k}(t+1)\right) \leq thrd_m, ym \in YM \\ YQ = \{j \mid VM_j \text{ is to be quiesced}\} \\ YR = \{j \mid VM_j \text{ is to be resumed}\} \\ YM = \{j \mid VM_j \text{ is to be migrated}\} \end{cases}$$

$thrd_q$, $thrd_r$, and $thrd_m$ are the thresholds for the costs of quiesce, resume and migration, respectively. Those values can be determined by the system or specified by administrators.

Whether $VM_j$ is to be quiesced, resumed, migrated, or unchanged is formally expressed by the relationship between $x_{i,j}(t)$ and $x_{i,j}(t+1)$, as shown below:

$$A = \sum_{i=1}^{m} [x_{i,j}(t+1) - x_{i,j}(t)];$$

$$B = \sum_{i=1}^{m} [x_{i,j}(t+1) - x_{i,j}(t)]^2$$

(1) $VM_j$ is to be quiesced $\Leftrightarrow A=-1$, $B=1$
(2) $VM_j$ is to be resumed $\Leftrightarrow A=1$, $B=1$
(3) $VM_j$ is to be migrated $\Leftrightarrow A=0$, $B=2$
(4) $VM_j$ is to be unchanged $\Leftrightarrow A=0$, $B=0$ This variant of the ROMKP problem is NP hard. At least one embodiment of the invention includes a designed ROWM approximate algorithm to solve the problem. There are two parts in the algorithm: the overload-remediation part that decides which VMs to quiesce/migrate when an overload occurs to a hypervisor, and the periodic-resume part that decides which quiesced VMs to resume when resources become sufficient.

Upon an overload (that is, resource usage exceeding a threshold thrd1), a set of VMs on the overloaded hypervisor is identified that have to be migrated or quiesced to remediate the overload. Then, a test is carried out to determine if all of the VMs in C (that is, the VMs consuming the most resources on the overloaded hypervisor such that the rest of the VMs consume less than a threshold thrd2) can be migrated to other hypervisors by applying a heuristic algorithm for MKP. The test will fail when there are insufficient resources. Accordingly, the VM with the least work value-to-resource usage ratio in the entire cloud is planned to be quiesced, and the test is carried out again. This procedure is continued until the test passes.

Subsequently, the planned-to-be-quiesced VMs in Q are checked to select those VMs that have been unnecessarily planned to be quiesced. After these steps, the final plan of migration and quiesce is obtained. The steps of periodic-resume part are similar to the description of the overload-remediation part above, except that a test is carried out to determine whether all quiesced VMs in C can be resumed.

This algorithm has the time complexity of O(n log n+nkm), where n is the number of VMs in the Cloud, k is the number of VMs to be migrated/resumed, and m is the number of hypervisors. It is polynomial time overhead, and can be implemented for, by way of example, clouds of hundreds of hypervisors and thousands of VMs.

Figure 2:
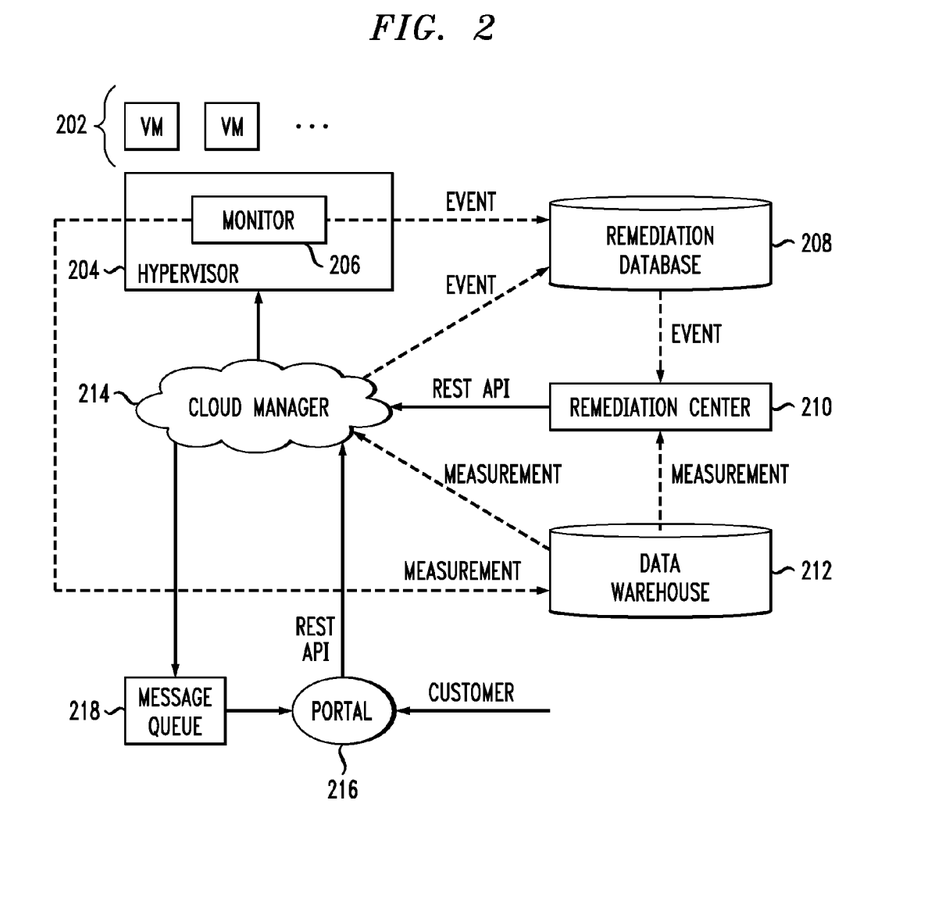
FIG. 2 is a diagram illustrating architecture of implementation of the overload remediation system in a target cloud, according to an embodiment of the present invention.

By way of example, at least one embodiment of the invention can be implemented as a MAPE (Monitor-Analyze-Plan-Execution) loop on a large cloud platform. FIG. 2 is a diagram illustrating architecture of implementation of the overload remediation system in a target cloud, according to an embodiment of the present invention. The shaded components in FIG. 2 are those components added to the target cloud for supporting overload remediation. The unshaded components in FIG. 2 are components of the cloud itself.

The cloud manager 214 is a software package in charge of VM provision, de-provision, migration, and other management operations for VMs 202. The data warehouse 212 stores measurement data which are periodically reported by the monitors 206 in hypervisors 204. A customer can issue commands to the cloud manager for conducting desired operations via a portal 216. A REST (REpresentation State Transfer) application programming interface (API) is leveraged between the portal and the cloud manager for requesting specific operations in the cloud manager. Additionally, a message queue component 218 can be implemented in between the cloud manager and the portal.

Compared with the basic overload remediation illustrated in FIG. 1, the system depicted in FIG. 2 includes a remediation database (DB) 208 to support persistency. The database stores events generated by the hypervisor monitor (for example, a "resource overload" event, an "overload remediated" event, etc.), status of the actions performed by the cloud manager (for example, "success of migration," "failure of resuming a VM," etc.), and the current states of all managed VMs (for example, "normally running," "overloaded," "quiesced," etc.). The remediation center 210 is a process running on a separate computer that periodically queries the remediation DB to process any new events received by the DB. When processing these events, the remediation center retrieves performance data from the data warehouse 212 as these data are needed in the remediation algorithms. When the decision of which VMs to be migrated, quiesced and/or resumed is made, commands are sent to the cloud manager to execute the decision.

Figure 3:
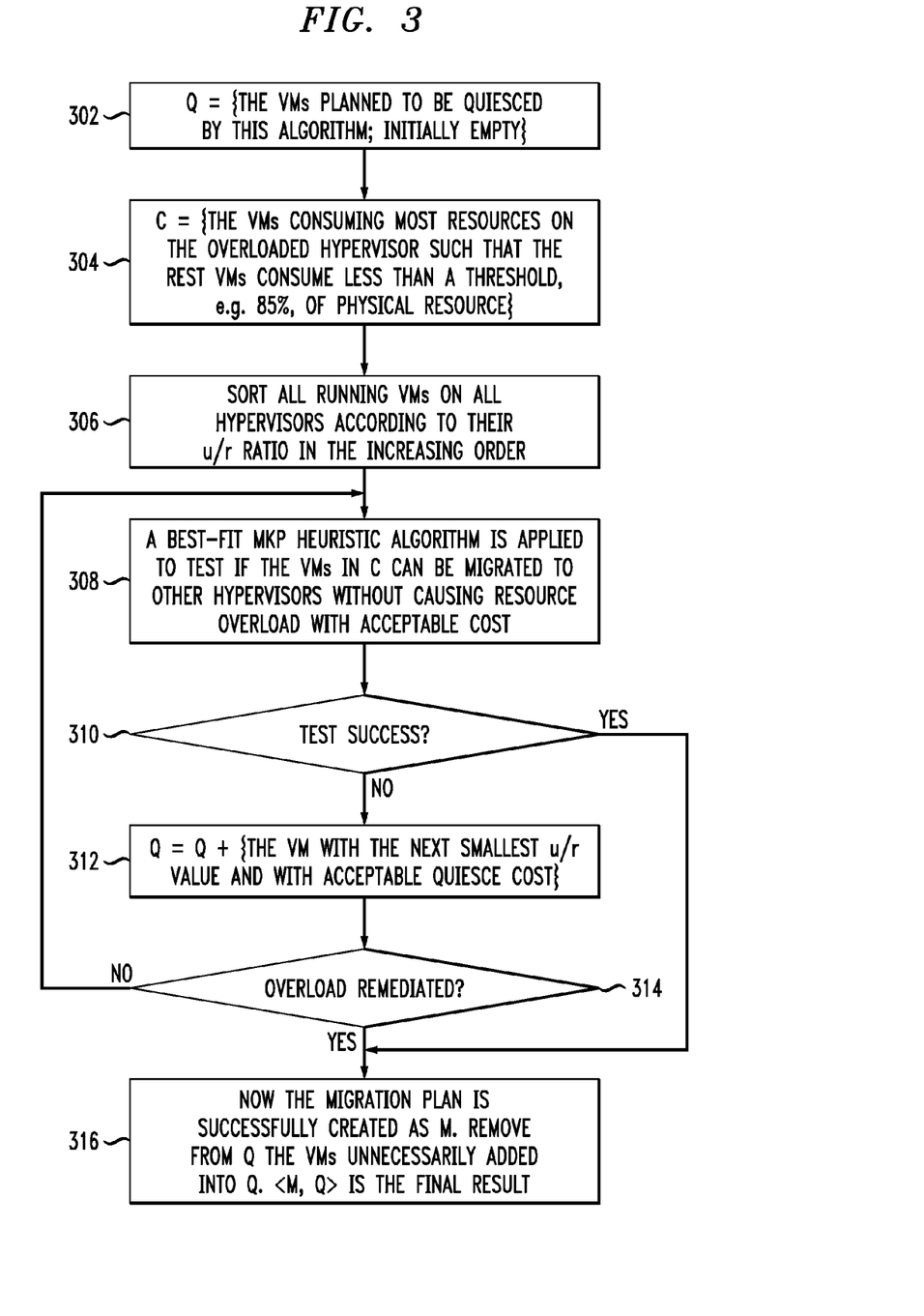
FIG. 3 is a diagram illustrating a selection algorithm for VM quiesce, according to an embodiment of the present invention.

FIG. 3 is a flow diagram illustrating a selection algorithm for VM quiesce, according to an embodiment of the present invention. In step 302, Q={the VMs planned to be quiesced by this algorithm; initially empty}. In step 304, C={the VMs consuming the most resources on the overloaded hypervisor such that the rest of the VMs consume less than a threshold (for example, 85%) of physical resources}. Step 306 includes sorting all running VMs on all hypervisors according to their U/R ratio in the increasing order. Step 308 includes testing to determine if the VMs in C can be migrated to other hypervisors (VMs in Q are considered to be quiesced) without causing resource usage more than a set threshold (for example, 85%) and with an acceptable migration cost. Criteria for an acceptable migration cost can be specified by system administrators according to their experience and expertise; criteria such as, for example, less than 80% of network bandwidth during a certain period. Also, a best-fit MKP heuristic algorithm is applied during the test. If the test is successful (as determined in step 310), then the work is carried out and the algorithm proceeds to step 316; otherwise, the algorithm proceeds to step 312.

In step 312, Q=Q+{the VM with the next smallest U/R value and with acceptable quiesce cost}. Step 314 includes determining if the overload is remediated. If yes, the algorithm proceeds to step 316; otherwise, the algorithm returns to step 308. Accordingly, the migration plan is successfully created as M, and step 316 includes removing from Q the VMs unnecessarily added into Q by step 312. <M, Q> is the final result.

Figure 4:
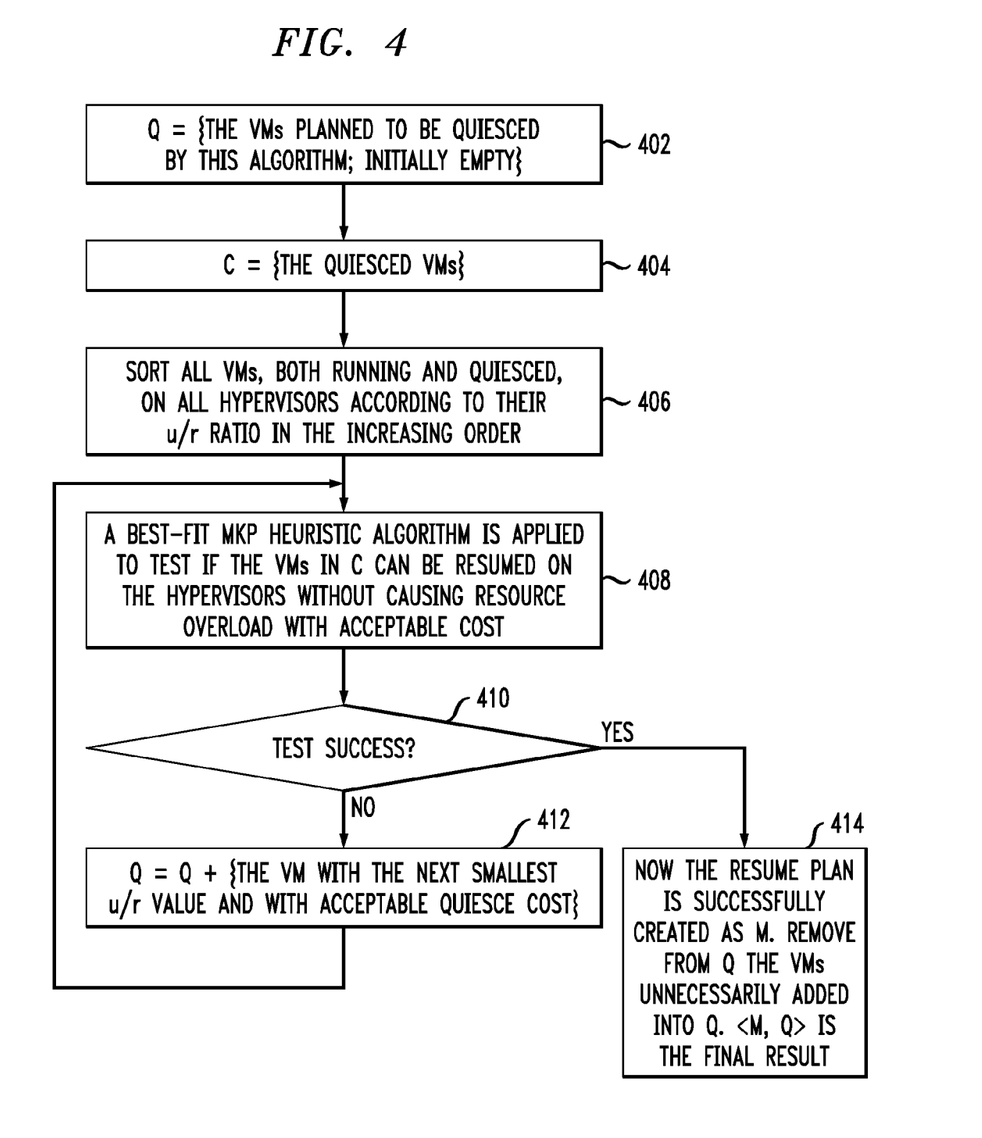
FIG. 4 is a diagram illustrating a selection algorithm for VM resume, according to an embodiment of the present invention.

FIG. 4 is a diagram illustrating a selection algorithm for VM resume, according to an embodiment of the present invention. In step 402, Q={the VMs planned to be quiesced by this algorithm; initially empty}. In step 404, C={the quiesced VMs}. Step 406 includes sorting all VMs, both running and quiesced, on all hypervisors according to their U/R ratio in the increasing order. Step 408 includes testing to determine if the VMs in C can be resumed on the hypervisors (VMs in Q are considered to be quiesced) without causing resource usage of more than a threshold (for example, 85%) and with acceptable resume cost. Also, a best-fit MKP heuristic algorithm is applied during the test.

Step 410 determines if the test was successful. If successful, the work is carried out and the algorithm proceeds to step 414. Otherwise, the algorithm proceeds to step 412. In step 412, Q=Q+{the VM with the next smallest U/R value and with acceptable quiesce cost}. Subsequently, the algorithm returns to step 408.

The resume plan is successfully created as M, and step 414 includes removing from Q the VMs unnecessarily added into Q by step 412. <M, Q> is the final result.

Figure 5:
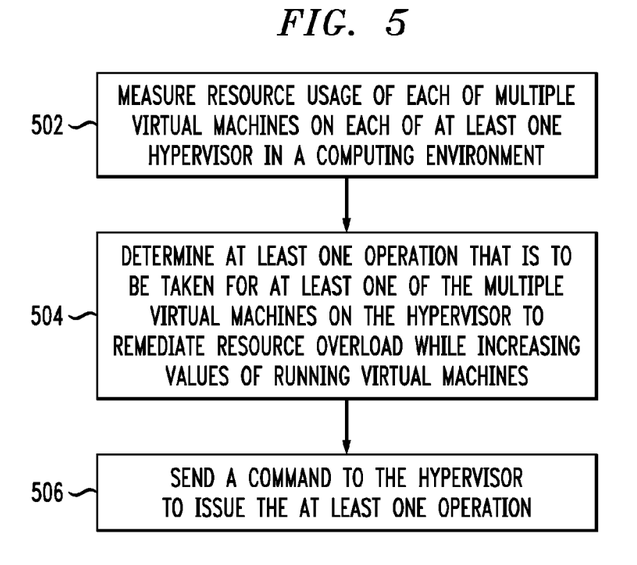
FIG. 5 is a flow diagram illustrating techniques for remediating overload in an over-committed computing environment, according to an embodiment of the invention.

FIG. 5 is a flow diagram illustrating techniques for remediating overload in an over-committed computing environment, according to an embodiment of the present invention. Step 502 includes measuring resource usage of each of multiple virtual machines on each of at least one hypervisor in a computing environment.

Upon detection of a resource overload on one of the at least one hypervisor, steps 504 and 506 are carried out. Step 504 includes determining at least one operation that is to be taken for at least one of the multiple virtual machines on the hypervisor to remediate resource overload while increasing or maximizing values of running virtual machines. As detailed herein, the operation can include at least one of migration, quiesce or resume.

Determining at least one operation that is to be taken can include computing a work value of each virtual machine on the hypervisor, wherein work value can include at least one of a measure of potential loss of services on the virtual machine caused by the virtual machine being quiesced, and a measure of an impact of the virtual machine being quiesced on execution of at least one other virtual machine. The work value of each virtual machine can include a combination of at least one factor including virtual machine lifetime, price, revenue, service level agreement, central processing unit utilization, virtual machine dependency, and workload prediction.

Additionally, determining an operation that is to be taken can include identifying at least one virtual machine with a lowest work value to quiesce and/or at least one virtual machine with a higher work value to resume for optimization. Further, determining at least one operation that is to be taken can include continuously measuring and leveraging the work value and resource consumption of each virtual machine. At least one embodiment of the invention can also include using a ratio of work value and resource consumption to determine whether any of a migrate, quiesce, or resume operation is to be taken on a virtual machine.

Step 506 includes sending a command to the hypervisor to issue the at least one operation. Additionally, the techniques depicted in FIG. 5 can include periodically determining whether sufficient resources become available for a quiesced virtual machine to resume.

As also detailed herein, at least one embodiment of the invention includes an automated overload remediation method for a virtualized environment. Such a method includes recovering from a system resource overloaded situation by selecting, from a plurality of virtual machines in the system, a subset of the virtual machines to migrate and a subset of the virtual machines to quiesce. Also, such an embodiment of the invention can include periodically selecting a subset of the virtual machines to migrate and a subset of the virtual machines to resume to increase the number of running virtual machines and increase work value achieved by the running virtual machines. As detailed herein, each migrate, quiesce and resume selection takes into account a work value metric contributed by each virtual machine. The work value metric combines one or more factors including virtual lifetime, price, revenue, service level agreement, central processing unit utilization, virtual machine dependency, and workload prediction.

Additionally, in at least one embodiment of the invention, a problem is formulated as a variant of a Removable Online Multiple Knapsack Problem (ROMKP). Such a formulated problem includes considering object work values and resource usages changing with time in addition to arrival of new objects, permitting knapsack operations including removal of one or more objects from a knapsack, moving one or more objects from one knapsack to another, and replacing one or more objects back into a knapsacks. Such a problem also includes considering costs of the knapsack operations in decision making.

A solution to the variant of ROMKP problem can include continuously measuring and leveraging the work value and resource usage of each virtual machine, using a ratio of work value and resource usage as criterion to make a decision for selecting a migrate, quiesce, or resume operation for one or more virtual machines, and computing a cost of each migrate, quiesce, and/or resume operations and using the cost as a constraint in problem formulation. Additionally, in at least one embodiment of the invention, the work value for a virtual machine is defined as 1/(resource usage) if the virtual machine was not quiesced during a given recent time period P, and infinity if the virtual machine was quiesced during the period P.

The techniques depicted in FIG. 5 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 6:
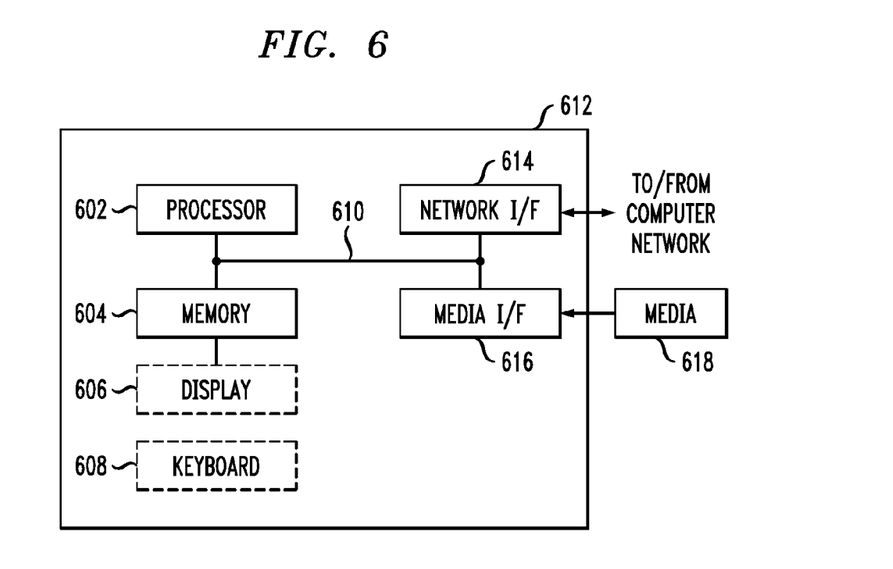
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, remediating hypervisor overload without assuming there is always resource available for migration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for remediating overload in an over-committed computing environment, the method comprising:
   measuring resource usage of each of multiple virtual machines on each of at least one hypervisor in a computing environment;
   upon detection of a resource overload on one of the at least one hypervisor:
      determining at least one operation from a set of multiple operations that is to be taken for at least one of the multiple virtual machines on the hypervisor to remediate resource overload while increasing values of running virtual machines, wherein said determining comprises:
         computing a work value of each of the multiple virtual machines on the hypervisor, wherein the work value is defined as (i) 1/(resource usage) if the virtual machine was not quiesced during a given time period and (ii) infinity if the virtual machine was quiesced during the given time period;
         computing a cost value associated with each of the multiple operations for each of the multiple virtual machines on the hypervisor; and
         using (i) a ratio of the work value and resource usage of each of the multiple virtual machines, and (ii) the computed cost values as criteria for said determining; and
      sending a command to the hypervisor to issue the at least one operation;
   wherein at least one of the steps is carried out by a computer device.

2. The method of claim 1, wherein the at least one operation comprises at least one of migration, quiesce or resume.

3. The method of claim 1, wherein said work value comprises at least one of a measure of potential loss of services on the virtual machine caused by the virtual machine being quiesced, and a measure of an impact of the virtual machine being quiesced on execution of at least one other virtual machine.

4. The method of claim 1, wherein determining at least one operation that is to be taken further comprises identifying at least one virtual machine with a lowest work value to quiesce and/or at least one virtual machine with a higher work value to resume for optimization.

5. The method of claim 1, wherein the work value of each virtual machine comprises a combination of at least one factor including virtual machine lifetime, price, revenue, service level agreement, central processing unit utilization, virtual machine dependency, and workload prediction.

6. The method of claim 1, wherein determining at least one operation that is to be taken further comprises continuously measuring and leveraging the work value and resource consumption of each virtual machine.

7. The method of claim 1, further comprising:
   periodically determining whether sufficient resources become available for a quiesced virtual machine to resume.

8. An article of manufacture comprising a computer readable storage medium having computer readable instructions tangibly embodied thereon which, when implemented, cause a computer to carry out a plurality of method steps comprising:
   measuring resource usage of each of multiple virtual machines on each of at least one hypervisor in a computing environment;
   upon detection of a resource overload on one of the at least one hypervisor:
      determining at least one operation from a set of multiple operations that is to be taken for at least one of the multiple virtual machines on the hypervisor to remediate resource overload while increasing values of running virtual machines, wherein said determining comprises:
         computing a work value of each of the multiple virtual machines on the hypervisor, wherein the work value is defined as (i) 1/(resource usage) if the virtual machine was not quiesced during a given time period and (ii) infinity if the virtual machine was quiesced during the given time period;
         computing a cost value associated with each of the multiple operations for each of the multiple virtual machines on the hypervisor; and
         using (i) a ratio of the work value and resource usage of each of the multiple virtual machines, and (ii) the computed cost values as criteria for said determining; and
      sending a command to the hypervisor to issue the at least one operation.

9. The article of manufacture of claim 8, wherein the at least one operation comprises at least one of migration, quiesce or resume.

10. The article of manufacture of claim 8 wherein said work value comprises at least one of a measure of potential loss of services on the virtual machine caused by the virtual machine being quiesced, and a measure of an impact of the virtual machine being quiesced on execution of at least one other virtual machine.

11. The article of manufacture of claim 8, wherein determining at least one operation that is to be taken further comprises identifying at least one virtual machine with a lowest work value to quiesce and/or at least one virtual machine with a higher work value to resume for optimization.

12. The article of manufacture of claim 8, wherein the work value of each virtual machine comprises a combination of at least one factor including virtual machine lifetime, price, revenue, service level agreement, central processing unit utilization, virtual machine dependency, and workload prediction.

13. The article of manufacture of claim 8, wherein the computer readable instructions which, when implemented, further cause a computer to carry out a method step comprising:
   periodically determining whether sufficient resources become available for a quiesced virtual machine to resume.

14. A system for remediating overload in an over-committed computing environment, comprising:
   at least one distinct software module, each distinct software module being embodied on a computer readable storage medium;
   a memory; and
   at least one processor coupled to the memory and operative for:
      measuring resource usage of each of multiple virtual machines on each of at least one hypervisor in a computing environment;
      upon detection of a resource overload on one of the at least one hypervisor:
      determining at least one operation from a set of multiple operations that is to be taken for at least one of the multiple virtual machines on the hypervisor to remediate resource overload while increasing values of running virtual machines, wherein said determining comprises:
         computing a work value of each of the multiple virtual machines on the hypervisor, wherein the work value is defined as (i) 1/(resource usage) if the virtual machine was not quiesced during a given time period and (ii) infinity if the virtual machine was quiesced during the given time period;
         computing a cost value associated with each of the multiple operations for each of the multiple virtual machines on the hypervisor; and
         using (i) a ratio of the work value and resource usage of each of the multiple virtual machines, and (ii) the computed cost values as criteria for said determining; and
      sending a command to the hypervisor to issue the at least one operation.

15. The system of claim 14, wherein the at least one operation comprises at least one of migration, quiesce or resume.

16. The system of claim 14, wherein said work value comprises at least one of a measure of potential loss of services on the virtual machine caused by the virtual machine being quiesced, and a measure of an impact of the virtual machine being quiesced on execution of at least one other virtual machine.

17. The system of claim 16, wherein the at least one processor is further operative for identifying at least one virtual machine with a lowest work value to quiesce and/or at least one virtual machine with a higher work value to resume for optimization.

18. The system of claim 16, wherein the at least one processor is further operative for periodically determining whether sufficient resources become available for a quiesced virtual machine to resume.

19. An automated overload remediation method for a virtualized environment, the method comprising:
   recovering from a system resource overloaded situation by selecting, from a plurality of virtual machines in the system, a subset of the virtual machines to migrate and a subset of the virtual machines to quiesce; and
   periodically selecting a subset of the virtual machines to migrate and a subset of the virtual machines to resume to increase the number of running virtual machines and increase a work value achieved by each of the running virtual machines, wherein the work value of a virtual machine is defined as (i) 1/(resource usage) if the virtual machine was not quiesced during a given time period and (ii) infinity if the virtual machine was quiesced during the given time period, and wherein said periodically selecting comprises:
      computing a cost value associated with migrating each of the plurality virtual machines and a cost associated with resuming each of the plurality virtual machines; and
      using (i) a ratio of the work value and resource usage of each of the plurality virtual machines, and (ii) the computed cost values as criteria for said selecting.

20. The method of claim 19, said periodically selecting comprises taking into account the work value contributed by each virtual machine.

21. The method of claim 20, wherein the work value combines one or more factors including price, service level agreement, central processing unit utilization, virtual machine dependency, and workload prediction.

22. The method of claim 21, wherein a problem is formulated as a variant of a Removable Online Multiple Knapsack Problem (ROMKP), comprising:
   considering object work values and resource usages changing with time in addition to arrival of new objects;
   permitting knapsack operations including removal of one or more objects from a knapsack, moving one or more objects from one knapsack to another, and replacing one or more objects back into a knapsacks; and
   considering costs of the knapsack operations in decision making.

23. The method of claim 22, wherein a solution to the variant of ROMKP problem comprises:
   continuously measuring and leveraging the work value and resource usage of each virtual machine.

* * * * *